United States Patent
Murooka et al.

(10) Patent No.: US 9,376,917 B2
(45) Date of Patent: Jun. 28, 2016

(54) FAN ROTOR BLADE AND FAN

(75) Inventors: Takeshi Murooka, Tokyo (JP); Hiroshi Kuroki, Tokyo (JP); Rintaro Kajiwara, Tokyo (JP); Kenro Obuchi, Tokyo (JP)

(73) Assignee: IHI Corporation, Tokyo (JP)

( * ) Notice: Subject to any disclaimer, the term of this patent is extended or adjusted under 35 U.S.C. 154(b) by 745 days.

(21) Appl. No.: 13/809,701

(22) PCT Filed: Jul. 12, 2011

(86) PCT No.: PCT/JP2011/065893
§ 371 (c)(1),
(2), (4) Date: Jan. 11, 2013

(87) PCT Pub. No.: WO2012/008452
PCT Pub. Date: Jan. 19, 2012

(65) Prior Publication Data
US 2013/0111908 A1    May 9, 2013

(30) Foreign Application Priority Data

Jul. 15, 2010   (JP) ................................. 2010-160709

(51) Int. Cl.
*F02C 1/00*      (2006.01)
*F01D 5/14*      (2006.01)
(Continued)

(52) U.S. Cl.
CPC ...... *F01D 5/147* (2013.01); *F01D 5/28* (2013.01); *F02K 3/00* (2013.01); *F04D 29/324* (2013.01);
(Continued)

(58) Field of Classification Search
CPC ..... F01D 5/28; F01D 5/282; F05D 2300/603; F05B 2280/6003; F05B 2280/702

USPC .................. 60/726; 416/224, 229 A, 230
See application file for complete search history.

(56) References Cited

U.S. PATENT DOCUMENTS 3,758,234 A    9/1973  Goodwin
3,762,835 A *  10/1973 Carlson .................. B29C 70/04
                                                    29/889.71
(Continued)

FOREIGN PATENT DOCUMENTS

GB    2 218 473 A    11/1989
JP    9 217602       8/1997
(Continued)

OTHER PUBLICATIONS

Office Action issued on Dec. 16, 2013 in the counterpart Canadian Patent Application No. 2,805,337.
(Continued)

*Primary Examiner* — Charles Freay
(74) *Attorney, Agent, or Firm* — Oblon, McClelland, Maier & Neustadt, L.L.P

(57) ABSTRACT

A fan rotor blade includes a blade body constructed of a composite material, a blade root constructed of the composite material, and a sheath attached to a leading edge of the blade body. The sheath includes a sheath main body and a pair of joint flanges, and is segmented into a sheath base segment and a sheath top segment. The sheath top segment has a longer length than a length of the sheath base segment along a span direction. A sheath length of the sheath main body at an assumed impact position with an obstacle is not shorter than 10% chord and not longer than 60% chord. A sheath length of the sheath along an end edge of the fan rotor blade is not shorter than 40% chord. The fan rotor blade possesses sufficient impact resistance and can be simplified and light-weighted.

4 Claims, 6 Drawing Sheets

(51) Int. Cl.
  *F01D 5/28* (2006.01)
  *F04D 29/32* (2006.01)
  *F02K 3/00* (2006.01)
  *F04D 29/38* (2006.01)

(52) U.S. Cl.
  CPC .......... *F04D 29/384* (2013.01); *F05D 2220/36* (2013.01); *F05D 2240/121* (2013.01); *F05D 2240/303* (2013.01); *Y02T 50/672* (2013.01); *Y02T 50/673* (2013.01)

(56) References Cited

U.S. PATENT DOCUMENTS

| | | | |
|---|---|---|---|
| 3,892,612 A * | 7/1975 | Carlson | F01D 5/282 156/150 |
| 5,375,978 A | 12/1994 | Evans et al. | |
| 5,672,417 A * | 9/1997 | Champenois | F01D 5/282 416/230 |
| 5,725,354 A | 3/1998 | Wadia et al. | |
| 5,785,498 A | 7/1998 | Quinn et al. | |
| 2008/0075601 A1 | 3/2008 | Giusti et al. | |
| 2009/0074586 A1 * | 3/2009 | Le Hong | F01D 5/147 416/230 |
| 2011/0229334 A1 * | 9/2011 | Alexander | F01D 5/282 416/224 |
| 2013/0004324 A1 * | 1/2013 | Hansen | C25D 1/006 416/224 |

FOREIGN PATENT DOCUMENTS

| | | |
|---|---|---|
| JP | 2005 113908 | 4/2005 |
| JP | 2008 32000 | 2/2008 |
| JP | 2008 88976 | 4/2008 |
| JP | 2009 68493 | 4/2009 |
| RU | 2 297 538 C2 | 4/2007 |
| SU | 823604 A1 | 4/1981 |

OTHER PUBLICATIONS

International Search Report Issued Oct. 18, 2011 in PCT/JP11/65893 Filed Jul. 12, 2011.

Decision on Grant issued Apr. 3, 2014 in Russian Patent Application No. 2013105773 with English language translation.

Extended European Search Report issued Jul. 22, 2015 in European Patent Application No. 11806782.6.

* cited by examiner

FF ←  → FR

FAN ROTOR BLADE AND FAN

TECHNICAL FIELD

The present invention relates to a fan for introducing air into an engine flow passage formed within an engine case of an aircraft engine.

BACKGROUND ART

Recently, a composite material (FRP) made of plastic and reinforced fiber attracts attention as a high-strength light-weight material, and various fan rotor blades utilizing such a composite material are developed (see Patent Documents 1 to 4 listed below).

In a fan rotor blade utilizing the above-mentioned composite material, its blade body is constructed of the composite material. For example, the blade body is constructed of a composite material composed of thermosetting plastic such as epoxy resin or thermosoftening plastic such as polyetheretherketone (PEEK) and reinforced fiber such as carbon fiber. In addition, the blade body has a suction-side surface (convex surface) and a pressure-side surface (concave surface).

A blade root is integrally formed at a base end of a blade body. The blade root is also constructed of the composite material composed of thermosetting plastic such as epoxy resin or thermosoftening plastic such as polyetheretherketone and reinforced fiber such as carbon fiber. In addition, the blade root is coupled with a joint slot formed on an outer circumference of a fan disc.

Along a leading edge of the blade body, a sheath for protecting the leading edge is provided. The sheath extends along a span direction, and is composed of metal. Further, along a trailing edge (or, along an end edge and a trailing edge) of the blade body, a guard for reinforcing the blade body may be provided. Similarly to the sheath, the guard is composed of metal.

PRIOR ART DOCUMENT

Patent Document

Patent Document 1: Japanese Patent Application Laid-Open No. 2009-68493
Patent Document 2: Japanese Patent Application Laid-Open No. 2008-32000
Patent Document 3: Japanese Patent Application Laid-Open No. H9-217602
Patent Document 4: U.S. Pat. No. 5,375,978

SUMMARY OF INVENTION

Technical Problem

In order to ensure sufficient impact resistance of a fan rotor blade against an obstacle such as a bird or an ice slab suctioned into an engine case, it is generally necessary not only to provide a sheath along a leading edge of a blade body, but also to provide a guard along a trailing edge as explained above or make the blade body thick. However, if a guard is provided along a trailing edge, components of the fan rotor blade increase and its configuration becomes complicated and thereby its light-weighting is inhibited. In addition, if the blade body is made thick, its aerodynamic performance is subject to reduce and its light-weighting is inhibited.

An object of the present invention is to provide a fan rotor blade that utilizes a composite material and possesses sufficient impact resistance, and a fan that utilizes the fan rotor blade.

Technical Solution

A first aspect of the present invention provides a fan rotor blade that is constructed of a composite material composed of thermosetting or thermosoftening plastic and reinforced fiber to be utilized in a fan for introducing air into an engine flow passage formed in an inside of an engine case of an aircraft engine, and includes: a blade body that is constructed of the composite material and has a suction-side surface on one side thereof and a pressure-side surface on another side thereof; a blade root integrally formed at a base end of the blade body by the composite material and capable of being joined with a joint slot formed on an outer circumference of a fan disc of the fan; and a metallic sheath attached to a leading edge of the blade body so as to extend in a span direction for protecting the leading edge, wherein the sheath includes a sheath main body that becomes gradually thinner toward a front and a pair of joint flanges integrally extended from both rear edges of the sheath main body, and is segmented into a sheath base segment on a base end side of the blade body and a sheath top segment on a top end side of the blade body, the sheath top segment smoothly continues from the sheath base segment, and has a longer length than a length of the sheath base segment along the span direction, a sheath length of the sheath main body at an assumed impact position that is a radially outermost position on the sheath top segment to be contacted with an obstacle suctioned into the engine case is equal-to or longer-than 10% chord and equal-to or shorter-than 60% chord, and a sheath length of the sheath along an end edge of the fan rotor blade is equal-to or longer-than 40% chord.

Note that a "fan rotor blade" includes not only a narrow-defined fan rotor blade, but also a compressor rotor blade which is provided on a most upstream side for intaking air into an engine case. In addition, a "sheath length" means a length along a direction connecting equivalent span positions on a leading edge and a trailing edge of a fan rotor blade.

According to the first aspect, since the sheath length of the sheath main body at the assumed impact position is equal-to or longer-than 10% chord and equal-to or shorter-than 60% chord, impact energy by an obstacle can be reduced sufficiently. In addition, since the sheath length of the sheath along the end edge of the fan rotor blade is equal-to or longer-than 40% chord, a maximum strain by a stress wave generated at the end edge of the fan rotor blade by an impact of an obstacle to the fan rotor blade can be made equal-to or smaller-than the maximum allowable strain criterion. Therefore, sufficient impact resistance of the fan rotor blade 23 can be ensured without providing a guard for reinforcing the blade body along a trailing edge of the blade body and so on and without making the blade body thick. In addition, configurations of the fan rotor blade can be simplified and the fan rotor blade can be light-weighted by reducing components of the fan rotor blade without reducing aerodynamic performance of the fan rotor blade.

A second aspect of the present invention provides a fan that introduces air into an engine flow passage formed in an inside of an engine case of an aircraft engine, and includes: a fan disc that is provided in the inside of the engine case rotatably about an axial center, and on whose outer circumference a plurality of joint slots are formed; and a plurality of fan rotor blades according to the first aspect that are joined with the plurality of joint slots, respectively.

According to the first aspect, in addition to an achievement of the advantages according to the first aspect, the fan rotor blade is rotated integrally with the fan disc when the fan disc is rotated upon operating the aircraft engine, so that air can be introduced into the engine flow passage within the engine case.

DESCRIPTION OF EMBODIMENTS

First, two new insights obtained while realizing a fan rotor blade that possesses sufficient impact resistance will be explained.

Figure 4:
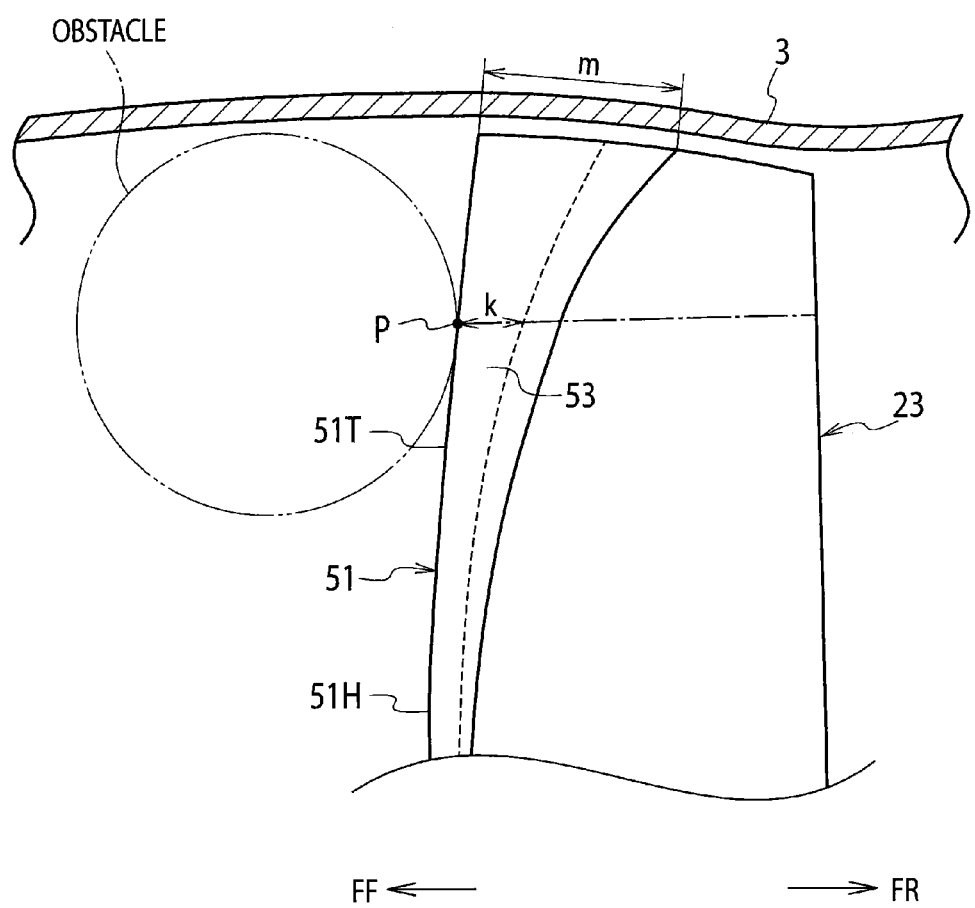
FIG. 4 is a side view showing a sheath length k of a sheath main body at an assumed impact position and a sheath length m of a sheath along an end edge of the fan rotor blade.
Figure 5:
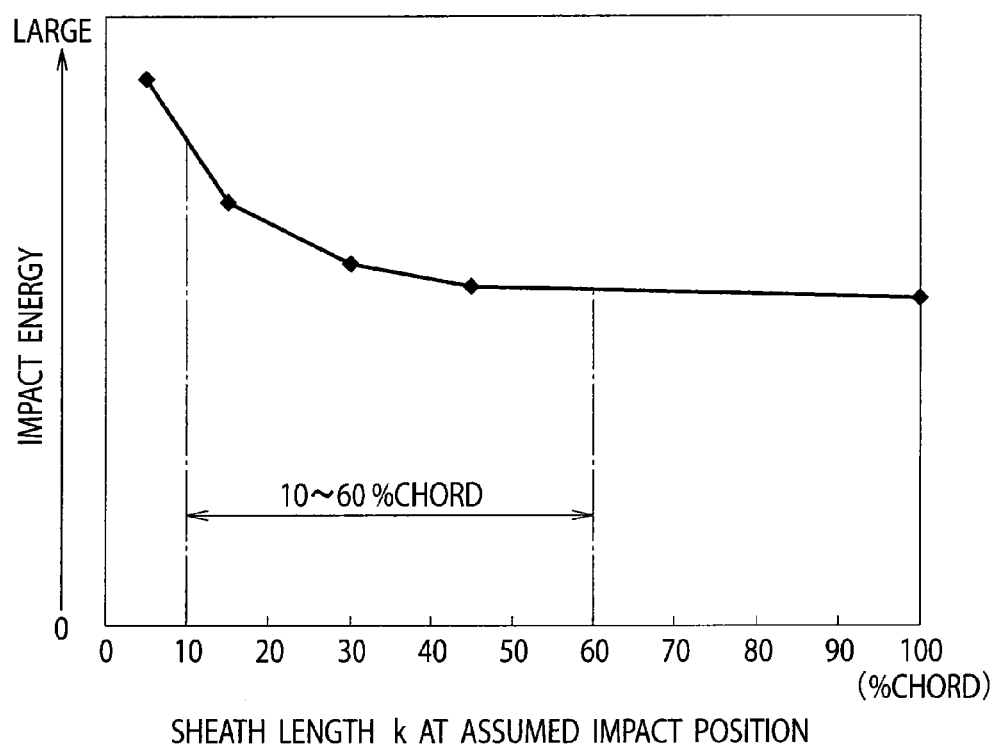
FIG. 5 is a graph showing a relation between the sheath length k and impact energy by an obstacle.

The first insight will be explained with reference to FIGS. 4 and 5. As shown in FIG. 4, a length of a sheath main body (see the sheath main body 53 which is derived from an entire sheath 51 by loss of joint flanges 55 and 57 shown in FIG. 2) along a chord direction at an assumed impact position P (a radially outermost position) on a sheath top segment 51T to be contacted with an obstacle (a bird, an ice slab or the like suctioned into an engine case) is defined as a sheath length k. Here, as shown by a graph in FIG. 5, impact energy by an obstacle can be reduced when the sheath length k is made equal-to or longer-than 10% chord (=10% length of an entire length of a fan rotor blade along a chord direction), and an effect for reducing the impact energy doesn't improve even when it is made longer than 60% chord. Note that the assumed impact position P is determined specifically based on a size of an assumed obstacle, a size of the fan rotor blade 23 and so on.

Figure 6:
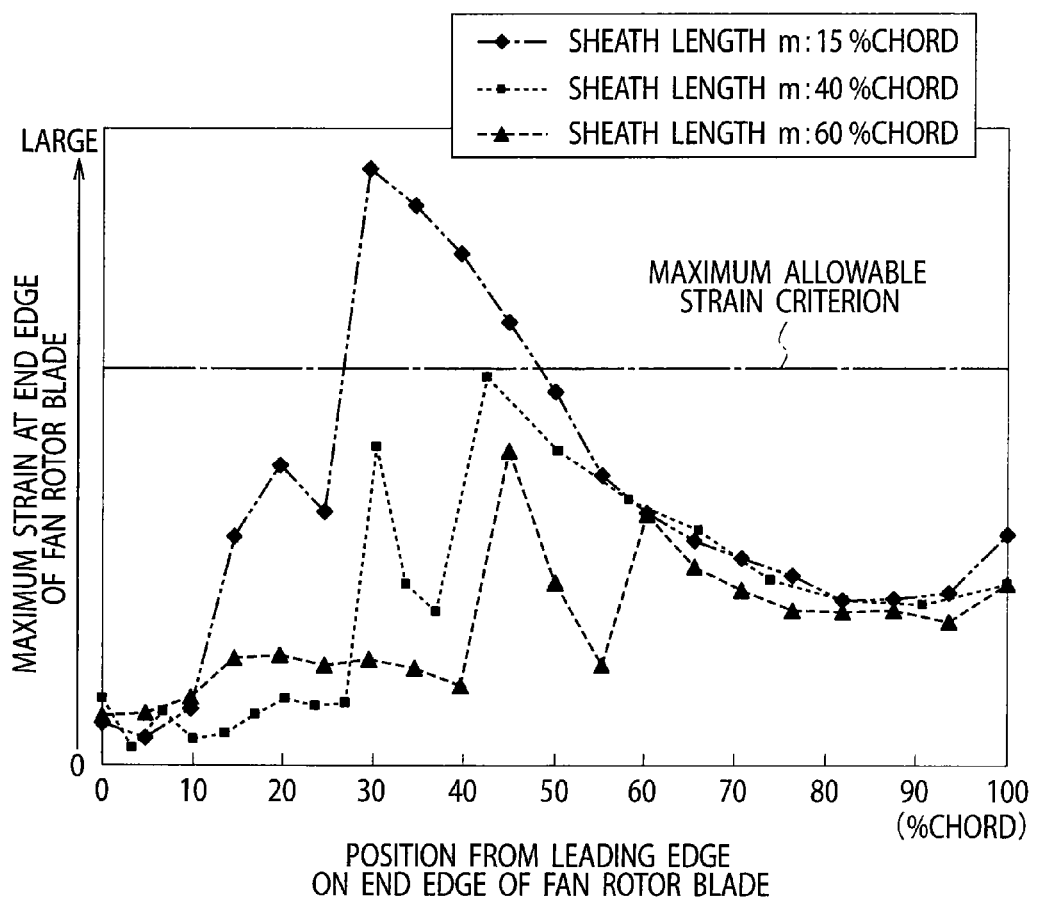
FIG. 6 is a diagram showing a relation(s) between a position from a leading edge on the end edge of the fan rotor blade and a maximum strain of the end edge at the position.

The second insight will be explained with reference to FIGS. 4 and 6. As shown in FIG. 4, a length of the sheath 51 (see the entire sheath 51 shown in FIG. 2) along an end edge of the fan rotor blade 23 is defined as a sheath length m. Here, as shown in FIG. 6, a maximum strain by a stress wave generated at the end edge of the fan rotor blade 23 by an impact with an obstacle can be made equal-to or smaller-than a maximum allowable strain criterion when the sheath length m is made equal-to or longer-than 40% chord. Note that the "maximum allowable strain criterion" is a maximum strain at the end edge of a fan rotor blade that is considered allowable experimentally and empirically.

Note that a relation between a position from a leading edge and a maximum strain in each sheath length m is calculated through an impact stress analysis under a condition where a 2.53 pounds (about 1.1 kilogram) obstacle suctioned into an engine case 3 impacts to the assumed impact position P.

An embodiment of a fan rotor blade 23 (and a fan 1 utilizing it) will be explained with reference to FIGS. 1 to 3. Note that, in the drawings, an "FF" indicates a forward direction, and an "FR" indicates a rearward direction.

Figure 3:
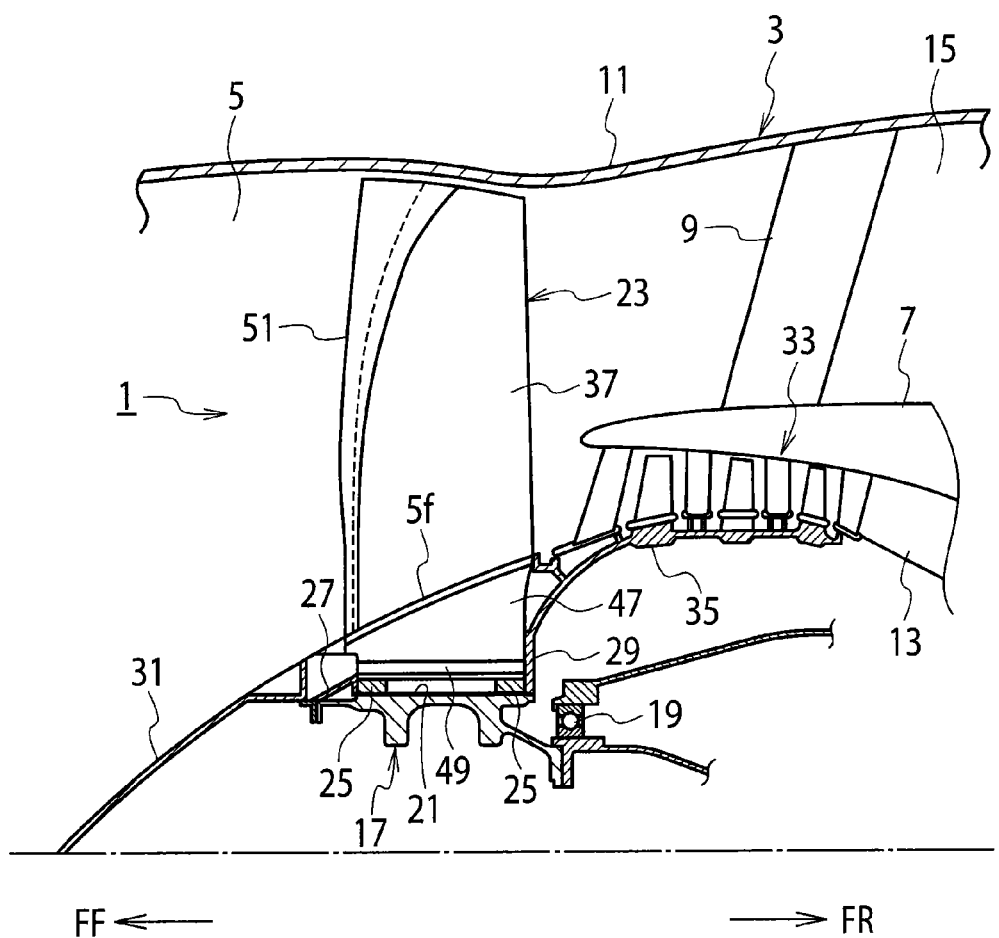
FIG. 3 is a cross-sectional side view of a front portion of an aircraft engine including the fan rotor blade(s).

As shown in FIG. 3, a fan 1 introduces air into an engine flow passage 5 formed within the engine case 3 of an aircraft engine. The engine case 3 is constructed of a cylindrical core cowl 7, and a nacelle 11 provided around the core cowl 7 with struts 9 (only one of them is shown) interposed therebetween. The engine flow passage 5 is branched, in the middle of it, into an annular (cylindrical) core flow passage (primary flow passage) 13 formed inside the core cowl 7, and a bypass flow passage 15 formed inside the nacelle 11 and outside the core cowl 7.

In front of the core cowl 7, a fan disc 17 is provided rotatably with a bearing 19 interposed. The fan disc 17 is integrally and concentrically coupled with plural low-pressure turbine rotors (not shown) disposed behind the fan 1. In addition, plural joint slots 21 are equiangularly formed on an outer circumference of the fan disc 17.

The fan rotor blade 23 is jointed with each of the joint slots 21 of the fan disc 17. The fan rotor blade 23 is constructed of a composite material (FRP) composed of thermosetting plastic and reinforced fiber. Spacers 25 are disposed between a bottom of the joint slot 21 and the fan rotor blade 23, respectively. A ring-shaped front retainer 27 for holding the fan rotor blade 23 from the front is provided in front of the fan disc 17, and a ring-shaped rear retainer 29 for holding the fan rotor blade 23 from the back is provided behind the fan disc 17. Note that the front retainer 27 is integrally coupled with a nose cone 31 for guiding air, and the rear retainer 29 is integrally and concentrically coupled with a low-pressure compressor rotor 35 of a low-pressure compressor 33 disposed behind the fan 1.

Therefore, when the fan disc 17 is rotated upon operating the aircraft engine, the fan rotor blade(s) 23 is rotated integrally with the fan disc 17 to introduce air into the engine flow passage 5 (the core flow passage 13 and the bypass flow passage 15).

Configurations of the fan rotor blade 23 will be explained with reference to FIGS. 1 and 2. The fan rotor blade(s) 23 is utilized in the fan 1 as explained above, and includes a blade body 37. The blade body 37 is constructed of a composite material composed of thermosetting plastic (epoxy resin, phenol resin, polyimide resin or the like) and reinforced fiber (carbon fiber, aramid fiber, glass fiber or the like). As shown in FIG. 1, the blade body 37 has a suction-side surface (convex surface) 39 on its one side, and a pressure-side surface (concave surface) 41 on its other side. As shown in FIG. 2, a first stepped portion 43 extending along a span direction is formed along a front edge of the suction-side surface 39 of a main body of the blade body 37, and a second stepped portion 45 extending along the span direction is formed along a front edge of the pressure-side surface 41 of the main body of the blade body 37.

Note that the blade body 37 may be constructed of a composite material composed of thermosoftening plastic (polyetheretherketone, polyphenylenesulfide or the like) and reinforced fiber instead of a composite material composed of thermosetting plastic and reinforced fiber.

A blade root 47 is integrally formed at a base end of the blade body 37. The blade root 47 is also constructed of a composite material composed of thermosetting plastic (epoxy resin, phenol resin, polyimide resin or the like) and reinforced fiber (carbon fiber, aramid fiber, glass fiber or the like). In addition, the blade root 47 includes a dovetail 49 that is jointed with the joint slot 21 formed on the outer circumference of the fan disc 17.

Note that the blade root 47 may also be constructed of a composite material composed of thermosoftening plastic (polyetheretherketone, polyphenylenesulfide or the like) and reinforced fiber instead of a composite material composed of thermosetting plastic and reinforced fiber.

Here, a boundary between the blade body 37 and the blade root 47 coincides with a flow passage surface 5f of the engine flow passage 5.

A sheath 51 is attached along a leading edge of the blade body 37. The sheath 51 is composed of metal (titanium alloy or the like) extended along the span direction. The sheath 51 includes a sheath main body 53 located at its front, and a pair of a first joint flange 55 and a second joint flange 57 integrally extended from both rear edges of the sheath main body 53, respectively. The first joint flange 55 and the second joint flange 57 cover, together with the sheath main body 53, a front edge of the main body of the blade body 37 (which is derived from the blade body 37 by loss of the sheath 51). The sheath main body 53 becomes gradually thinner toward the front, and its front edge turns out to be the leading edge of the blade body 37. The first joint flange 55 is integrally extended from a rear edge on a side of the suction-side surface 39 of the sheath main body 53. The first joint flange 55 is joined onto the above-explained first stepped portion 43 by a sheet-shaped adhesive material. Further, the second joint flange 57 is integrally extended from a rear edge on a side of the pressure-side surface 41 of the sheath main body 53. The second joint flange 57 is joined onto the above-explained second stepped portion 45 by a sheet-shaped adhesive material.

Main portions (featured portions) of the fan rotor blade 23 will be explained. The sheath 51 is segmented, along an extending direction (the span direction) of the fan rotor blade 23, into a sheath base segment 51H on a base end side (a hub side) of the blade body 37 and a sheath top segment 51T on a top end side of the blade body 37. In addition, the sheath top segment 51T and the sheath base segment 51H continue smoothly to each other, and their boundary point I is located at a position of 50 to 80% span (=50 to 80% length of an entire length of a fan rotor blade along a span direction) from a base end (a hub end) of the sheath 51.

The sheath length k of the sheath main body 53 at the above-explained assumed impact position P (80% span from the base end of the sheath 51 in the present embodiment) on the sheath 51 (the sheath top segment 51T) is equal-to or longer-than 10% chord and equal-to or shorter-than 60% chord, preferably equal-to or longer-than 10% chord and equal-to or shorter-than 30% chord. Here, the sheath length k is made equal-to or longer-than 10% chord based on the above-explained first new insight. In addition, if the sheath length k is made longer than 60% chord, a weight of the sheath 51 becomes too heavy.

The sheath length m of the sheath 51 (the sheath top segment 51T) is equal-to or longer-than 40% chord, preferably equal-to or longer-than 40% chord and equal-to or shorter-than 60% chord. Here, the sheath length m is made equal-to or longer-than 40% chord based on the above-explained second new insight.

According to the present embodiment, the above-explained sheath length k is made equal-to or longer-than JO % chord and equal-to or shorter-than 60% chord, so that impact energy by an obstacle such as a bird and an ice slab can be reduced sufficiently. In addition, the above-explained sheath length m is made equal-to or longer-than 40% chord, so that a maximum strain by a stress wave generated at the end edge of the fan rotor blade 23 by an impact of an obstacle to the fan rotor blade 23 can be made equal-to or smaller-than the maximum allowable strain criterion. Therefore, sufficient impact resistance of the fan rotor blade 23 can be ensured, while restricting increase of its weight, without providing a guard for reinforcing the blade body 37 along a trailing edge of the blade body 37 and so on and without making the blade body 37 thick.

Therefore, configurations of the fan rotor blade can be simplified and the fan rotor blade 23 can be light-weighted by reducing components of the fan rotor blade 23 without reducing aerodynamic performance of the fan rotor blade 23.

Figure 1:
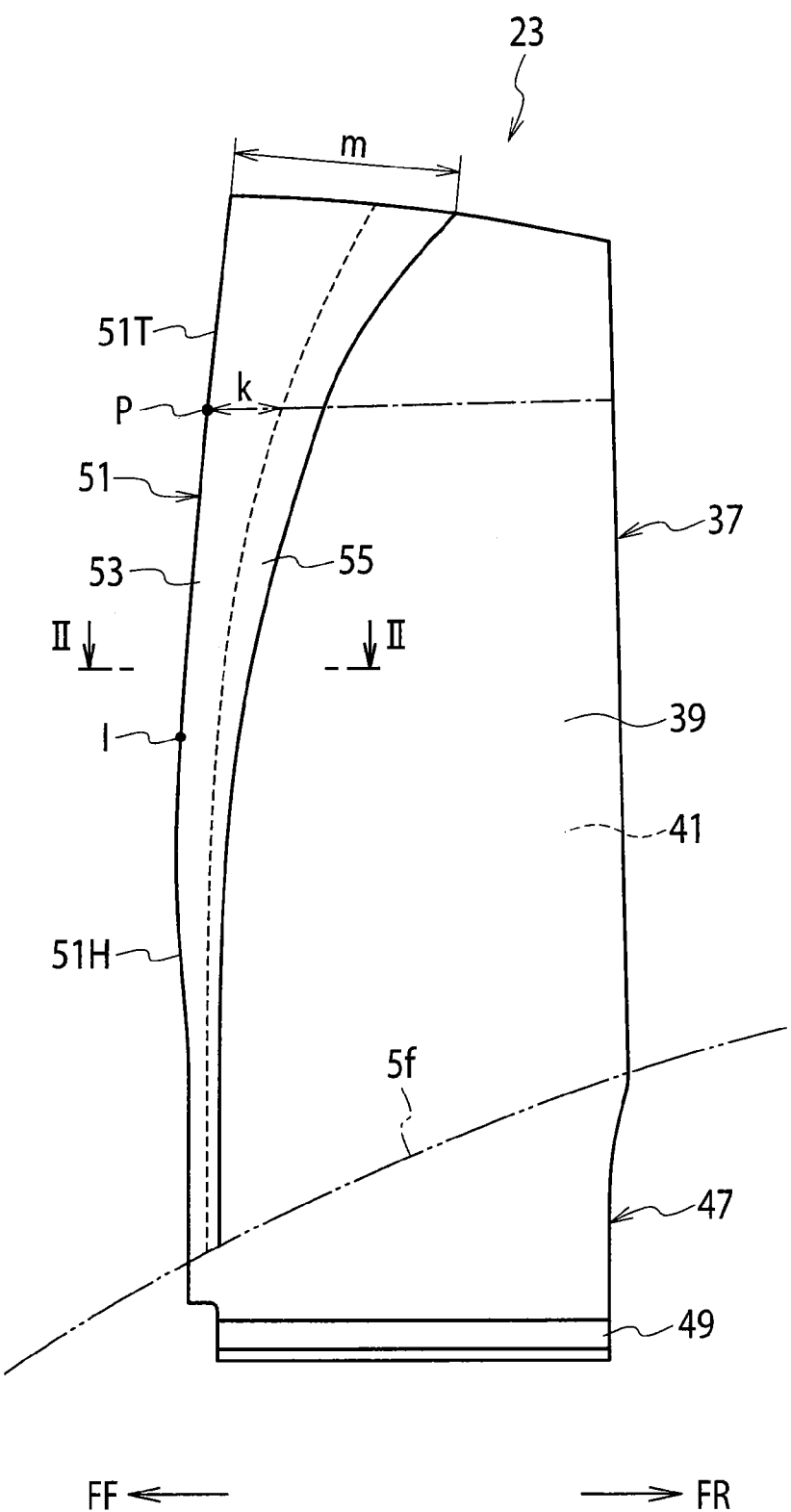
FIG. 1 is a side view of a fan rotor blade according to an embodiment.
Figure 2:
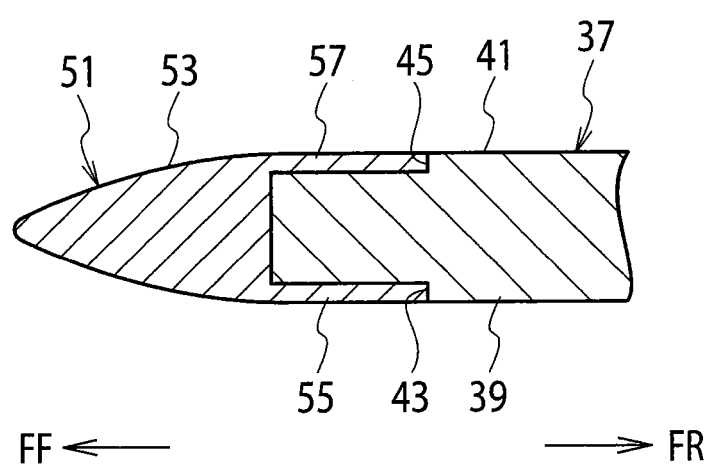
FIG. 2 is an enlarged cross-sectional view taken along a line II-II shown in FIG. 1.

In addition, the length of the sheath 51 along the chord direction is made gradually longer from the sheath base segment 51H toward the sheath top segment 51T (from bottom to top in FIG. 1). Since the sheath base segment 51H has a small rotational radius, its rotational speed becomes slower than that of the sheath top segment 51T. Therefore, an impact speed of the sheath base segment 51H toward an obstacle becomes slower than that of the sheath top segment 51T, so that a length of the sheath along the chord direction is not required to be made long and it contributes to its light-weighting by shortening the length. Here, the length of the sheath 51 along the chord direction is made gradually longer from the sheath base segment 51H toward the sheath top segment 51T, so that impact resistance and light-weighting of the fan rotor blade 23 can be realized with well-balanced.

Note that the present invention is not limited to the above embodiment, and can be realized with multiple variations. In addition, scope of right included in the present invention is not limited to the above embodiment.

The invention claimed is:

1. A fan rotor blade constructed of a composite material composed of thermosetting or thermosoftening plastic and reinforced liber to be utilized in a fan for introducing air into an engine flow passage formed in an inside of an engine case of art aircraft engine, the fan rotor blade comprising:
   a blade body that is constructed of the composite material and has a suction-side surface on one side thereof and a pressure-side surface on another side thereof;
   a blade root integrally formed at a base end of the blade body by the composite material and capable of being joined with a joint slot formed on an outer circumference of a fan disc of the fan; and
   a metallic sheath attached to a leading edge of the blade body so as to extend in a span direction for protecting the leading edge, wherein
   the sheath includes a sheath main body that gradually decreases in thickness toward a leading edge of the fan rotor blade and a pair of joint flanges integrally extended from both rear edges of the sheath main body, and is segmented into a sheath base segment on a base end side of the blade body and a sheath top segment on a top end side of the blade body,
   the sheath top segment smoothly continues from the sheath base segment, and is not longer than the sheath base segment along the span direction,
   a sheath length of the sheath along a chord direction of the fan rotor blade is gradually made larger from a base end toward a top end of the sheath,
   a sheath length "k" of the sheath main body along the chord direction is gradually made larger from the base end toward the top end of the sheath main body,
   each sheath length of the pair of joint flanges along the chord direction is gradually made larger from a base end toward a top end of said each of the pair of joint flanges,
   the sheath length "k" of the sheath main body at a position of 80% span from the base end of the sheath is 10% chord≤k≤60%/chord, a sheath length "m" of the sheath along an end edge of the fan rotor blade is 40% chord<m<60% chord.

2. The fan rotor blade according to claim 1, wherein the sheath length "k" of the sheath main body at the assumed impact position is 10% chord<k<30% chord.

3. The fan rotor blade according to claim 1, wherein all portions excluding the sheath are constructed of the composite material.

4. A fan for introducing air into an engine flow passage formed in an inside of an engine case of an aircraft engine, the fan comprising:
   a fan disc that is provided in the inside of the engine case rotatably about an axial center, and on whose outer circumference a plurality of joint slots are formed; and
   a plurality of fan rotor blades according to claim 1 that are joined with the plurality of joint slots, respectively.

* * * * *